UNITED STATES PATENT OFFICE.

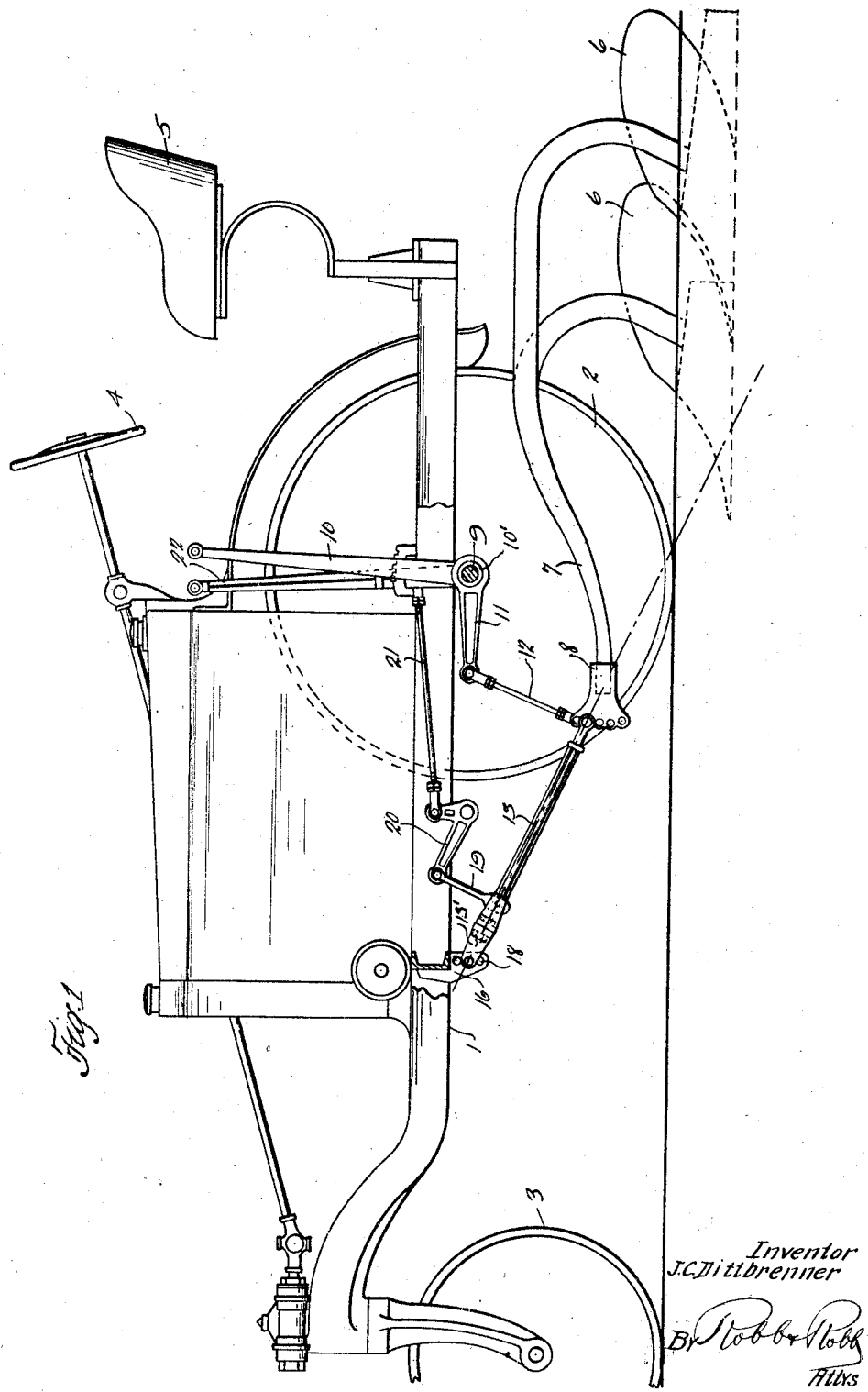

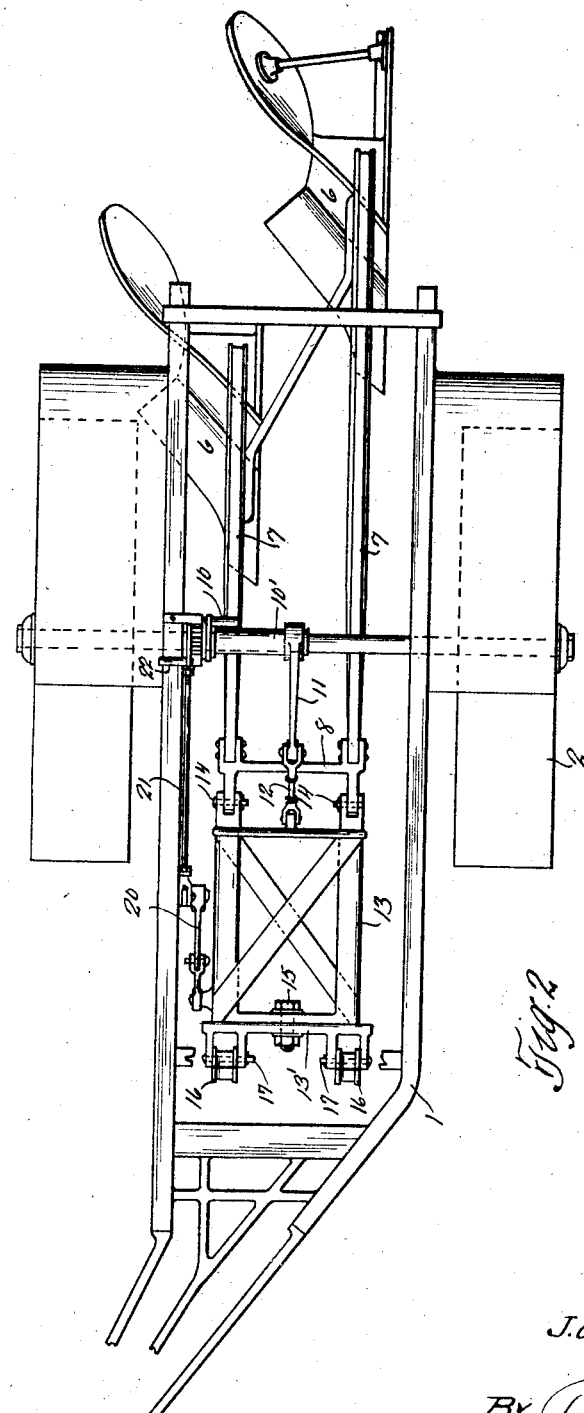

JOHN C. DITTBRENNER, OF INDIANAPOLIS, INDIANA, ASSIGNOR TO HOLTON TRACTOR COMPANY, OF DOVER, DELAWARE, A CORPORATION OF DELAWARE.

TRACTOR-PLOW.

1,378,842.    Specification of Letters Patent.    Patented May 24, 1921.

Application filed December 4, 1919. Serial No. 342,488.

*To all whom it may concern:*

Be it known that I, JOHN C. DITTBRENNER, a citizen of the United States, residing at Indianapolis, in the county of Marion and State of Indiana, have invented certain new and useful Improvements in Tractor-Plows, of which the following is a specification.

The present invention relates to improvements in agricultural implements and in particular to tractor plows, having as its primary object to provide a novel draft connection between the tractor vehicle and the implement operated thereby, the arrangement of which connection is such as to act to convert the resistance set up on the plow-share or shares into tractive effort with the resultant advantage of enabling the tractor to be built much lighter than would otherwise be permitted unless traction were sacrificed.

A further object in view is to provide means for adjusting the earth-working elements so as to regulate the depth of cut and control the level for running position of these members, the latter, in the parlance of the plowman, overcoming the tendency to " wing."

These and such other objects as may hereinafter appear are attained by the novel construction, combination and arrangement of parts to be hereinafter particularly described and claimed. Reference will now be had to the accompanying drawings forming a part of this specification, wherein, Figure 1 is a side elevation of a tractor device embodying my invention, a portion of the frame being broken away and parts shown in section to more clearly disclose the details of the invention; and Fig. 2 is a top plan view of the apparatus, all parts supported above the frame being omitted.

Throughout the following detailed description and on the several figures of the drawings, similar parts are referred to by like reference characters.

Referring to the drawings, the tractor vehicle forming the subject-matter of this invention, comprises the frame 1, supported by the ground wheels 2 and the forward guide wheel 3. The frame carries a suitable power plant 3 having its driving connection with the ground wheels, but the characteristic details of which need not be specifically described herein because they form no part of this invention. A steering wheel 4 is arranged at a convenient place with respect to operator's seat 5 disposed on the rear end of the frame. All of these features are more or less conventional except that it should be noted that the apparatus is unusually light in construction as is permitted by virtue of the draft connection for the earth-working implement operated by this tractor vehicle.

I have illustrated a two-gang plow as the earth-working means, but I do not thereby restrict myself to these particular elements. The arrangement of the plows with respect to each other is conventional also, their beams 7 extending forwardly beneath the frame 1 and being connected by a cross head 8. The position of the forward end of the plow beams, it is important to observe, is approximately beneath the dead axle 9 of the vehicle, or more strictly speaking just a little in advance thereof. It is, of course, well known that one of the main adjustments required for plowing is that for regulation of depth of cutting action, and for this purpose the plows in my apparatus are adjusted by means of a hand lever 10 arranged in front of the seat 5 and connected to a sleeve 10' surrounding the axle 9. From the sleeve an arm 11 projects forwardly and horizontally and from this extends the connecting rod 12 connecting with the rear end of the draft connection 13, later described. The length of the rod 12 is subject to adjustment, as clearly shown.

Obviously when the lever 10 is moved forwardly the beams of the plows are depressed, and this modifies the position of the plow points to cause them to run deeper. Movement of the lever in the reverse direction elevates the plow beams with a corresponding modification toward a shallower depth.

The draft connection between the plows and the vehicle frame is of special importance and this will now be described. The coupling member is in the form of a frame as indicated at 13, and is pivotally connected with the plow head 8 by the clevis pins 14. This permits of vertical swinging of the forward end of the plow-beams in the manner before mentioned through the adjustment of the lifting lever 10. At the opposite end, however, the frame 13 is provided with a swivel connection 15 to a cross-bar 13', which in turn has pivotal connection with the cross-beam 16 of the frame 1. The last pivot connections, viz., the pins 17, are capable of being adjusted vertically in any one of the several openings 18 in the beam 16 for this purpose. While I have described the connection of the lever 10 to the coupling frame, I desire it to be understood that said connection could be made direct to the plow head without affecting the efficiency of the device, this being within the purview of my invention. To one side of this coupling member or frame 13 is connected a link 19 from a bellcrank lever 20, which in turn is connected by the rod 21 to an adjusting lever 22, which I term for the purposes of this description the leveling lever. This is arranged adjacent to the lifting lever, so that either of these may be easily reached from the operator's seat. The other main adjustment of a plow which is required is that with respect to its level, for unless this is taken care of the plow or plows will not ride easily or flat in the furrow. By my arrangement of underhold hitch this adjustment is easily obtained by means of the lever 22, which when moved forwardly or rearwardly will turn the coupling frame 13 and the plows therewith about a longitudinal axis in either direction. It will be apparent from the foregoing that the hitch constitutes or acts as a universal joint, producing perfect flexing of the draft connection as desired. With this arrangement, as hereinbefore premised, the resultant draft force exerts a downward pressure upon the traction wheels and this is what enables the machine to be built much lighter than would be possible in an ordinary two-plow tractor of equal efficiency. In other words, the greater the draft stress upon the plow points, by virtue of depth of plowing or character of the soil, etc., the greater the force tending to pull the vehicle to the ground. The foregoing will be apparent from a consideration of the line of force applied to Fig. 1 of the drawing.

It will be apparent that when the tilling implement is suspended from the axle and from the frame with the points of suspension in advance of said axle, the draft stress will be such as to not only increase the traction as above recited, but will overcome or counteract any tendency on the part of the forward end of the draft device to rise and turn over the axle thereby upsetting the apparatus. Furthermore, since the weighted end or that end of the implement carrying the tilling means is free to revolve about these points of suspension, the circle described thereby in the swinging movement, instead of intersecting the wheel circle will be rather either surrounding or tangential or osculatory thereof, which will cause the plow or the like to enter the ground to a greater depth than would be otherwise the case where the tilling implement is connected in rear of the axle and to make a more angular incision instead of a comparatively flat one.

It should be understood that the method of draft connection described above most effectively adapts the tractor for square turning at the ends of the furrows, for it is contemplated to use with this apparatus any suitable means on the vehicle frame for raising the plows from the ground when a turn is to be made, but this means forms no part of the present invention and is therefore neither illustrated nor described herein.

Having thus described my invention, what I claim as new is:

1. In an agricultural implement of the class described, the combination with a draft frame and traction wheels therefor, of tilling means suspended adjacent one end from the center of the wheels, and from the frame in advance of such wheel center.

2. In an agricultural implement of the class described, the combination with a draft frame and traction wheels for said frame, of tilling means suspended adjacent one end from the wheel axle in advance thereof, and means for suspending said end of the tilling means from said frame in advance of the wheel axle.

3. In an agricultural implement the combination with a draft frame and traction wheels therefor, of a tilling element suspended from the axle of said wheels adjacent one end of said tilling means, and means spaced from said suspending means for suspending the said end of the tilling means from said frame.

4. In an agricultural implement the combination with a draft frame and traction wheels therefor, of tilling means suspended from the axle of said wheels adjacent one end of said tilling means and in advance of said wheel axle, and means intermediate the frame and the tilling means and connected thereto for suspending the tilling means from said frame.

5. In an agricultural implement the combination with a draft frame and traction wheels therefor, of a tilling element suspended from the axle of said wheels adjacent its end, means longitudinally rotatable and connecting said frame to said tilling means in advance of said wheel axle.

6. In an agricultural implement the combination with a draft frame and traction wheels therefor, of tilling means weighted at one of its ends, a longitudinally rotatable frame intermediate its other end and said draft frame, and connected thereto and to the tilling means, means adjacent the frame-connected end of said tilling means for suspending said tilling means on the axle of said wheels and in advance thereof.

7. In an agricultural implement the combination with a draft frame and traction wheels therefor, and a wheel axle on which said wheels are rotatably mounted, of tilling means weighted at one end, means for suspending said tilling means on said wheel axle in advance thereof and adjacent the other end of said tilling means, a substantially longitudinally rotatable frame connected to said suspended end of the tilling means and to said frame, and operating means connected to said frame, and operating means connected to said suspending means.

8. In an agricultural implement, in combination, a draft frame, traction wheels therefor, a wheel axle on which said wheels are mounted, a substantially longitudinally extending tilling element weighted at one end, means suspending the unweighted end of said element from said wheel axle, means on said axle for swinging said suspending means, a longitudinally tiltable frame connected to said suspended end of the tilling means, and swively connected to said frame in advance of said wheels, and operating means connected to said tiltable frame.

9. In an agricultural implement the combination with a draft frame and traction wheels therefor, and a wheel axle on which said wheels are rotatably mounted, of a substantially longitudinally extending tilling element weighted at one end, the other end of said tilling means being suspended from the wheel axle and from the draft frame in advance of such wheel axle.

10. In an agricultural implement in combination a draft frame, traction wheels therefor, a wheel axle on which said wheels are rotatably mounted, plowing means arranged beneath the frame, lifting means arranged on said wheel axle, and connected to said plowing means in advance of said axle, a substantially rectangular frame having pivotal connection to the plowing means at one end and swively connected at the other end to the draft frame, and leveling means connected to said frame adapted for rotating the latter about its swivel connection.

11. In an agricultural implement of the class described, the combination with a draft frame and traction wheels therefor, of tilling means having its forward end suspended from the frame and from the center of said wheels, both points of suspension being in advance of the wheels, permitting free movement of its other end in an arc oscillatory to the wheel circle.

In testimony whereof I affix my signature.

JOHN C. DITTBRENNER.